United States Patent [19]

Liepold et al.

[11] 3,962,851

[45] June 15, 1976

[54] SELF-PROPELLED HOP HARVESTING MACHINE

[75] Inventors: Adolf Liepold, Schwarzenbruck; Hermann Daum, Feucht near Nurnberg; Helmut Lindner, Rothenbach, all of Germany

[73] Assignee: Fella-Werke G.m.b.H., Nürnberg, Germany

[22] Filed: Dec. 9, 1974

[21] Appl. No.: 531,105

[30] Foreign Application Priority Data
Dec. 7, 1973  Germany............................ 2360989

[52] U.S. Cl.................................. 56/126; 130/30 D
[51] Int. Cl.². .......................................... A01D 41/08
[58] Field of Search...................... 56/126; 130/30 D

[56] References Cited
UNITED STATES PATENTS
2,193,354  3/1940  Thys ................................. 130/30 D FOREIGN PATENTS OR APPLICATIONS
1,260,848  2/1968  Germany ......................... 130/30 D
1,153,200  8/1963  Germany ......................... 130/30 D

*Primary Examiner*—Hugh R. Chamblee
*Attorney, Agent, or Firm*—Fleit & Jacobson

[57] ABSTRACT

This invention provides a self-propelled hop picking machine including a hop bine draw-through device which, as the machine moves forward, pulls bines in the path of movement of the machine rearwardly, preferably at a speed greater than the forward speed of travel of the machine, so as to pull such bines from their supporting wires and to convey the bines to picking elements for removal of the hop cones from the bines.

3 Claims, 3 Drawing Figures

SELF-PROPELLED HOP HARVESTING MACHINE

The invention relates to self-propelled hop harvesting machines.

It is an object of this invention to provide an improved self propelled hop harvesting machine in which the bines are drawn through the machine and automatically detached from their bracing wires and fed to picking elements.

According to the invention, there is provided a self propelled hop harvesting machine comprising drive means for propelling the machine in a forward direction, a vine draw-through means in the form of two endless chains arranged side-by-side and providing an upper vine conveying run and a lower return run, an upwardly open U-shaped member extending arcuately over the top of the machine from the front thereof and housing and guiding said upper vine conveying run of said chains, means for driving said chains so that said upper run moves in a rearward direction, and picking means located in the path of movement of a vine when conveyed by said upper run of the chains constructed to engage said vine and to remove the hop cones therefrom. Such a construction enables one to dispense with mechanically actuatable clamping elements as the severed vine stem can be clamped simply by being engaged between said chains. This has the advantage of providing a less costly construction as well as a reliable vine entraining action. Moreover, the width of the bine draw-through means can then be made narrower, whereby the working width of the picking means is better utilised.

To provide an increased clamping effect, the spacing of the two draw-through chains may be less rearwardly of the front end of the guide than at said front end.

In order that the invention may more readily be understood, reference will now be made by way of example to the accompanying drawings, in which.

Figure 1:
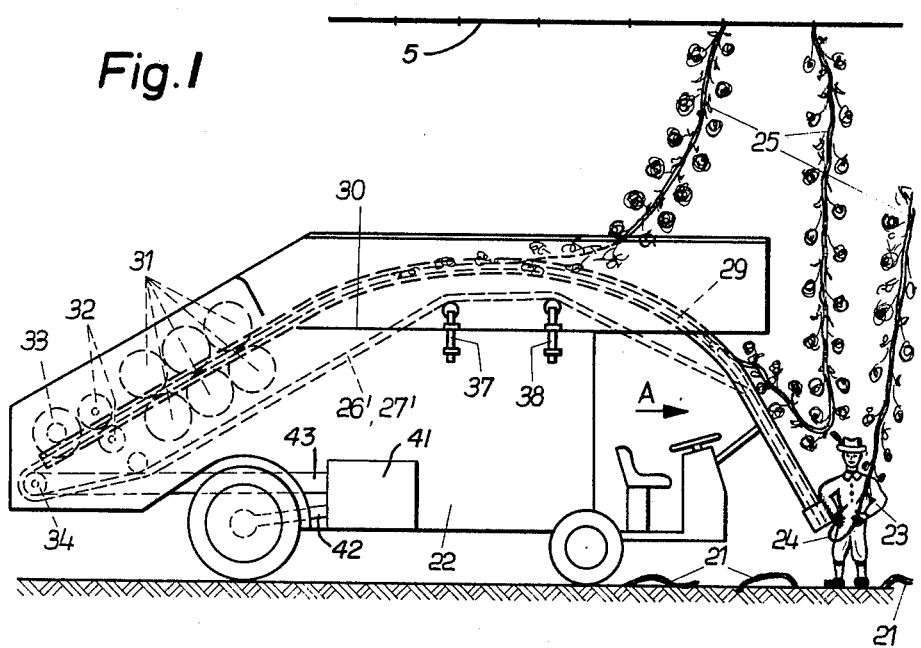
FIG. 1 is a side view of one embodiment of hop harvesting machine according to this invention.

In the drawings only those components which are absolutely essential for an understanding of the invention are illustrated.

Figure 2:
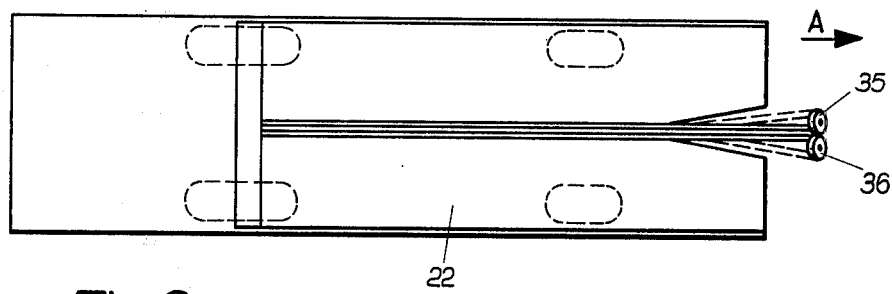
FIG. 2 is a plan view of the machine of FIG. 1.
Figure 3:
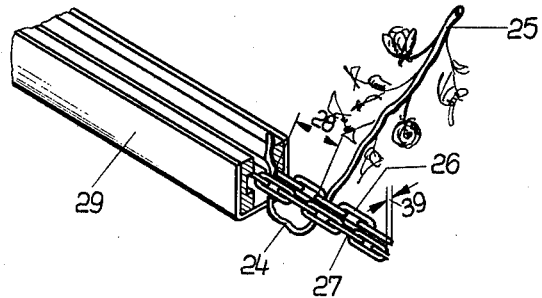
FIG. 3 is a perspective view of part of the vine draw-through means of the machine of FIG. 1.

Referring to FIGS. 1 to 3, the self-propelled hop harvesting machine there illustrated is indicated generally by the reference 22. The machine is provided with drive means 41, which may be any suitable conventional power source, e.g. an internal combustion engine, which is coupled by a suitable transmission 42 of any conventional form to propel the machine slowly in a forward or working direction "A". All activities of the machine can be controlled by one person 23, preferably, provided with a driving seat at the forward end of the machine as shown. This is possible by virtue of a relatively slow working speed being used and by virtue of the fact that the machine is designed to have a comparatively stiff steering so that it tracks safely along the ridges which extend along the hop field and from which the hop vine 25 climb up guide strings as far as the points of attachment of such strings to hop bracing wires 5.

The machine 1 has a vine draw-through means designed as an endless rotating conveyor which extends substantially over the whole length of the machine and is in the form of a pair of endless chains 26 and 27, the upper runs of which extend arcuately over the top of the machine in a guide 29. In use of the machine, the operator 23 grasps the lower end 24 of a severed hop vine 25, bends it arcuately and feeds it between the draw-through chains 26 and 27. By this operation the now upwardly projecting free end 24 of the vine 25 is clamped first, the vine passes along underneath the draw-through chains 26 and 27 and is clamped again at a position a distance 28 from the first clamping position as shown in FIG. 3. By means of this twofold clamping, the gripping of the conveyed material is increased on the one hand, and the risk of the vine stem breaking during the subsequent process of the vine being torn off the upper bracing wire 5 is avoided on the other hand.

The traction chains 26 and 27 are guided in a guide 29 which is a moulding of an upwardly open U-shaped cross-section firmly secured to the frame of the machine. The guide 29 is disposed to run steeply upwardly at the forward end of the hop harvesting machine 22 and then extends arcuately over a platform 30 and passes downwardly between horizontally mounted picking drums 31 at the rearward end of the machine. It then extends through a chaff-cutting device, comprising two compression rollers 32 and a cutter 33. The picking drums 31 comprise a set of upper picking drums cooperating with a corresponding set of lower picking drums rotating in the opposite sense. The plane through the drum axes of each set of drums inclines downwardly rearwardly as shown. As the guide 29 inclines downwardly between the drums, the chains thus pull the vines 25 through the drums. Advantageously, the traction chains 26 and 27 are driven by twin drive sprockets 34 at the rearward end and at the front end they pass over return wheels 35 and 36. The drive sprockets 34 are driven by any suitable means, for example as shown by transmission 43 from the machine drive means 41. The transmission 43 is such that the vine draw-through chains are driven in a direction such that the upper runs of the chains move in the rearward direction i.e., opposite to the direction A of travel of the machine. For a successful picking operation and optimal harvest with the upper runs of the chains of the vine draw-through means running in a direction opposite to the direction of travel of the machine, the speed of such runs should be faster than the speed of the machine.

The loose or return chain runs 26' and 27' of the traction chains 26 and 27 are returned underneath the moulding 29 and is tensioned by means of vertically or substantially vertically adjustable chain tensioning wheels 37 and 38. The vine draw-through chains 6 begin their conveying function at the front end of the guide 29 where the severed end of the vine is engaged and pulled in the rearward direction, while the harvesting machine is moving in the forward direction of arrow A. As soon as the vine has assumed an extended attitude it is torn off the hop bracing wire 5 and falls lengthwise onto the horizontal platform 30 on the upper structure of the machine 1. For the purpose of providing a stronger clamping effect during the operation of the bine being torn off the upper bracing wire 40, the spacing 39 between the two draw-through chains 26 and 27 in the arcuate portion of the draw-through means which extends over the platform 30 is less than the spacing between these chains in the remainder of the means. A stalk 21 at the root end of the vine remains where each vine has been severed and, after the harvest, this stalk is clipped and the residue removed as waste. A conveyor belt not shown in the drawings may be disposed below the picking drums and parallel or substantially parallel to the plane through the axes of the drums of the lower set. This conveyor belt delivers the stems and leaves removed by the picking operation or by the disengagement of the vines from the hop bracing wire to a cleaner, also not shown.

We claim:

1. A self-propelled hop harvesting machine comprising drive means for propelling the machine in a forward direction, a vine draw-through means in the form of two endless chains arranged side-by-side and providing an upper vine-conveying run and a lower return run, an upwardly open U-shaped member extending arcuately over the top of the machine from the front thereof and housing and guiding said upper vine-conveying run of the said chains, means for driving said chains so that said upper run moves in a rearward direction and picking means located in the path of movement of a vine when conveyed by said upper run of the chains constructed to engage said vine and remove the hop cones therefrom.

2. The machine specified in claim 1 in which the spacing of the said chains from one another is less at a position rearwardly of the front end of said member than it is at said front end.

3. The machine specified in claim 1, including essentially vertically arranged chain tensioners tensioning said return run of the chains.

* * * * *